United States Patent [19]

Browning

[11] 4,372,732
[45] Feb. 8, 1983

[54] CONTROL MECHANISM FOR A WINDMILL

[75] Inventor: James A. Browning, Hanover, N.H.

[73] Assignee: Browning Engineering Corporation, Hanover, N.H.

[21] Appl. No.: 221,108

[22] Filed: Dec. 29, 1980

[51] Int. Cl.³ .............................................. F03D 7/04
[52] U.S. Cl. .................................... 416/14; 416/32
[58] Field of Search ............................ 416/12–14, 416/41 A, 44 A, 47 (U.S. only), 43 A, 32, 31, 37, 1, DIG. 4, DIG. 6

[56] References Cited

U.S. PATENT DOCUMENTS

| 1,707,235 | 4/1929 | Sargent | 416/11 |
| 1,767,303 | 6/1930 | Miller | 416/13 |
| 3,952,723 | 4/1976 | Browning | 415/2 A X |
| 4,297,075 | 10/1981 | Jacobs et al. | 416/14 |
| 4,297,076 | 10/1981 | Donham et al. | 416/11 X |
| 4,298,313 | 11/1981 | Hohenemser | 416/11 X |
| 4,316,096 | 2/1982 | Syverson | 416/13 X |

FOREIGN PATENT DOCUMENTS

| 1077160 | 3/1960 | Fed. Rep. of Germany | 416/44 A |
| 1104458 | 4/1961 | Fed. Rep. of Germany | 416/132 B |
| 715089 | 11/1931 | France | 416/132 B |
| 922918 | 6/1947 | France | 416/11 |
| 937903 | 8/1948 | France | 416/44 A |
| 1037777 | 9/1953 | France | 416/44 A |
| 1402883 | 5/1965 | France | 416/44 A |
| 2432626 | 4/1980 | France | 416/44 A |
| 224725 | 3/1943 | Switzerland | 416/14 |

*Primary Examiner*—Everette A. Powell, Jr.
*Attorney, Agent, or Firm*—Sughrue, Mion, Zinn, Macpeak & Seas

[57] ABSTRACT

A method and apparatus are provided for controlling the maximum power of a hydraulic windmill which is achieved by utilizing the overpressure created in a closed loop hydraulic energy conversion system to rotate the tail of the windmill away from its operating plane to reduce the power transmitted from the wind to the blades of the windmill. A mechanical braking mechanism may be applied to the windmill blade driven rotatable shaft upon a sensed overpressure in the hydraulic fluid which acts through a differential between the hydraulic overpressure and a preset pressure to effect closure of the brake.

7 Claims, 8 Drawing Figures 4,372,732

CONTROL MECHANISM FOR A WINDMILL

FIELD OF THE INVENTION

This invention relates to hydraulic windmills of the type where the windmill rotating blades act via a pump, to continuously circulate hydraulic fluid within a closed loop hydraulic circuit including a hydraulic motor and more particularly to a method and apparatus for preventing overpressurization of the hydraulic circuit at high wind velocities.

BACKGROUND OF THE INVENTION

Hydraulic windmills involve the rotation of the windmill blades to effect pumping of a hydraulic fluid through a closed loop which incorporates either a fluid driven generator or a friction heater for transforming or converting the mechanical energy to electric or thermal energy, or both as desired. My U.S. Pat. No. 3,952,723 covers such a basic hydraulic windmill wherein the power is transmitted through the closed loop hydraulic circuit, and wherein the maximum turning speed of the rotor via the windmill blades is governed by a pressure compensating flow control valve. In that patent, the rotation of two or more windmill blades about a generally horizontal axis and through a rotatable shaft is converted to a reciprocating pumping action by means of a suitable crank coupled to the shaft. The reciprocation of a piston within a closed cylinder functions to periodically force hydraulic fluid in a closed loop system to enter the cylinder during the suction stroke of the piston and to be forced from the cylinder during the expansion stroke. The hydraulic liquid may move through a fluid rectifier and is forced to pass through a hydraulic motor for converting the fluid flow into electrical energy by means of an electrical generator coupled to the hydraulic motor. Alternatively, by forcing the hydraulic fluid to pass through a restrictor, by means of a heat exchanger downstream of the restrictor, the thermal energy generated in passing through the restrictor may be transmitted via the further working fluid external of the hydraulic circuit.

It has been determined that with relatively large scale hydraulic windmills, the hydraulic circuit may also be used to govern an overpower condition resulting from excessive wind velocity or at times of loss of hydraulic fluid in the closed loop hydraulic circuit.

SUMMARY OF THE INVENTION

The present invention is directed to a method and apparatus which utilizes the pressure of the hydraulic fluid to position the windmill assembly tail, normally provided to maintain the windmill blading at right angles to the direction of flow of the wind, out of axis with the rotor shaft bearing the blades to thus rotate the blades "out of the wind." Further, as a result of a loss of hydraulic fluid pressure due to a large leakage of the hydraulic fluid, as sensed by appropriate sensors, controls may be activated to rotate the tail to its furtherest angular position relative to the axis of the rotor shaft.

Specifically, a first hydraulic cylinder may operate in response to overpressurization of the hydraulic fluid thereto to rotate the tail of the windmill from its operating plane. A second hydraulic cylinder, also coupled to the frame assembly mounting the tail, may function, upon sensing the loss of a minimum required hydraulic fluid pressure within the closed hydraulic loop, to rotate the tail of the windmill away from its operating plane irrespective of operation of said first cylinder. A counterweight may be operatively coupled to the assembly mounting the windmill tail so as to normally rotate the tail away from its operating plane, and a required minimum hydraulic fluid pressure within the system may be directed through said second hydraulic cylinder to maintain the tail in its operating plane.

Where the means for forcing the hydraulic fluid to circulate under pressure through the closed loop comprises a reciprocating piston within a cylinder which piston is operatively coupled by crank means to the rotating shaft bearing the windmill blading, the means for detecting and transmitting an overpressure of the hydraulic fluid within the closed loop hydraulic circuit may comprise a drilled hole through the piston rod of the cylinder bearing the piston, leading to a point outside said cylinder, and connected to said first and/or second hydraulic cylinders. A surge tank may be provided within the line leading from the hydraulic fluid drive cylinder to said first and second hydraulic cylinders for shifting of the tail away from its operating plane to provide an average peak pressure value maintained by a check value within said line, upstream of said surge tank. A bleed valve may be provided across the check valve to provide a predetermined loss of pressure through said control line to allow the tail to return to its operating plane when the overpressure condition is terminated, in response to a drop in wind velocity or the like.

The present invention is additionally directed to a method and apparatus for baking the hydraulic windmill by sensing an overpressure in the closed loop hydraulic fluid and using a pressure differential between that overpressure and a preset pressure to effect closure of a brake applied to the windmill drive shaft. Additionally, the braking mechanism may involve a mass in unstable equilibrium on a support with means sensing the falling of the mass from the support as a result of undue vibration of the windmill to operate the brake. The brake itself may comprise a circumferential shoe about which is supported a brake band, the shoe being borne by rotating shaft and with the brake band attached to and operating by an elongated arm. The arm is spring biased towards brake closed position and a pin or pawl mounted in obstructing position to the arm, as biased by the spring, and coupled to a spring biased piston whose side opposite the spring sees the closed loop hydraulic fluid whereby excessive fluid pressure in the closed loop hydraulic circuit removes or releases the pin or pawl to effect braking of the windmill drive shaft.

DESCRIPTION OF PREFERRED EMBODIMENT

The hydraulic windmill of the present invention is very similar to that of U.S. Pat. No. 3,952,723, referred to above, and the hydraulic transmission need not deliver power in excess of that required at full-output condition. For example, a hydraulic windmill employing a 70 foot diameter windmill blade assembly is designed to deliver 25 kilowatts of electrical energy in a 15 mile per hour wind. If the windmill is provided with a 25 kilowatt generator, any increase in wind velocity is of no practical use. Assuming an operating pressure of 500 psig for the hydraulic fluid within a closed loop hydraulic circuit generic to such hydraulic windmills, at this rated output in a fixed maximum rotary of 30 rpm, a further increase of wind velocity will result in an increase in hydraulic fluid above 500 psig. For these conditions, it would be advisable to unload partially the wind load acting on the windmill blades. Some designs rotate or feather the individual blades to effect such unloading of the windmill. Such systems as expensive and complex.

Figure 1A:
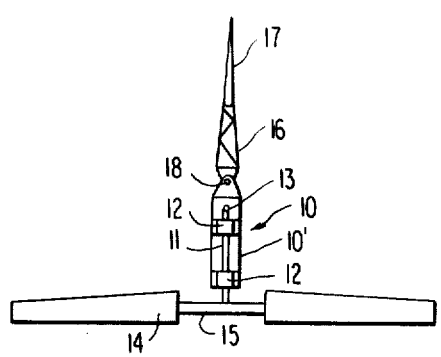
FIGS. 1a through 1c are plane views of the basic components of a hydraulic windmill with the hydraulic windmill tail in different angular positions relative to the wind.

As a basic aspect of the control scheme of the present invention, the control system involves the rotation of the windmill tail away from the rotor shaft axis, thus moving the windmill blades "out of the wind" by an amount which will limit the peak hydraulic fluid pressure to a value not much greater than 500 psig (in the illustrative windmill whose parameters are noted above). The revolvable tail thus acts as a governor. If wind velocity falls, the tail will move towards its full power operating position as illustrated in FIG. 1a. In FIG. 1a, the windmill, indicated generally at 10, is viewed directly from above. The windmill is comprised of a horizontal rotor or windmill drive shaft 11 being supported for rotation about its axis within longitudinally spaced bearings 12 fixed to a carriage 10'. A hub 15 bearing blades 14 attaches to the shaft 11 for rotation about the axis of the hub and the blades 14 (in this case dual blades) are held in a fixed relationship to the hub 15. The carriage 10' is mounted for rotation about a fixed vertical axis 13. In turn, the hydraulic windmill 10 is provided with a windmill holding tail 17 which is fixedly mounted to a horizontal frame 16, the frame 16 being rotatable on bearings about the vertical axis 18 (horizontally displaced from the axis 13 of rotation of the carriage 10').

In order to forcibly rotate the frame 16 and thus tail 17 about axis 18, hydraulic cylinders are employed as described hereinafter. The invention involves the application of hydraulic fluid to a given hydraulic cylinder which comes into operation for a small overpressure of the hydraulic fluid within a closed loop hydraulic circuit generic to hydraulic windmill such that the tail 17 is movable away from the axis of rotor shaft 11, FIG. 1b. Less power is transmitted from the wind to the blades, and the hydraulic fluid pressure will accordingly drop unless there is an unusually rapid increase in wind velocity. The maximum extent of rotation of the windmill blades 14 "out of the wind" is illustrated in FIG. 1c. As may be appreciated, by the angulation of the tail 17 with respect to the wind, as evidenced by the arrows, FIGS. 1a–1c, the carriage 10' is rotated about its axis 13. This tends to force the tail 17 back into a position nearly in line with the wind.

Figure 2:
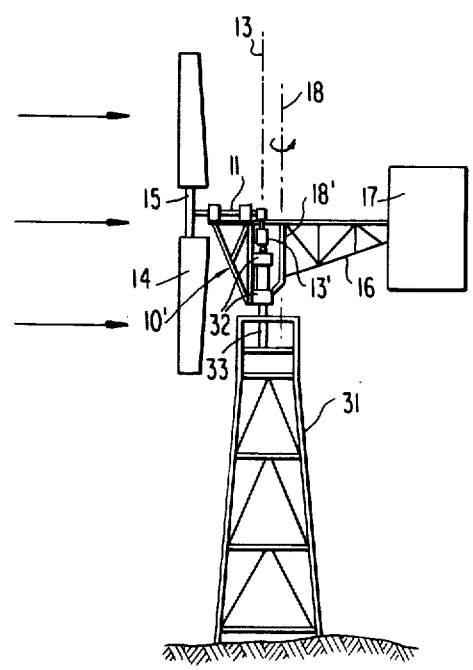
FIG. 2 is a side elevational view of the basic hydraulic windmill illustrated in FIGS. 1a–1c.

Referring next to FIG. 2, the side elevational view of the hydraulic windmill 10 illustrates a vertical tower 31 fixedly mounted at its lower end to the ground G or other earth formation, and vertically supporting at its upper end a heavy mass member 33 which defines the axis 13 about which carriage 10' is rotated, carriage 10' being rotatably mounted on bearings 32. The carriage 10' follows the change in wind direction or as a result of tail movement action. As mentioned previously, the carriage will rotate so as to cock the blades 14 relative to the wind in response to tail movement rotation of tail 17 and frame 16 about axis 18. A hydraulic drive cylinder 13' forming a principal component of the closed loop hydraulic circuit is mounted on the pivot axis 13 of carriage 10'. The tail frame 16 rotates about a parallel vertical axis 18 on bearings (not shown) mounted to the carriage 10' and in turn supporting the frame 16 for its rotation.

Figure 3:
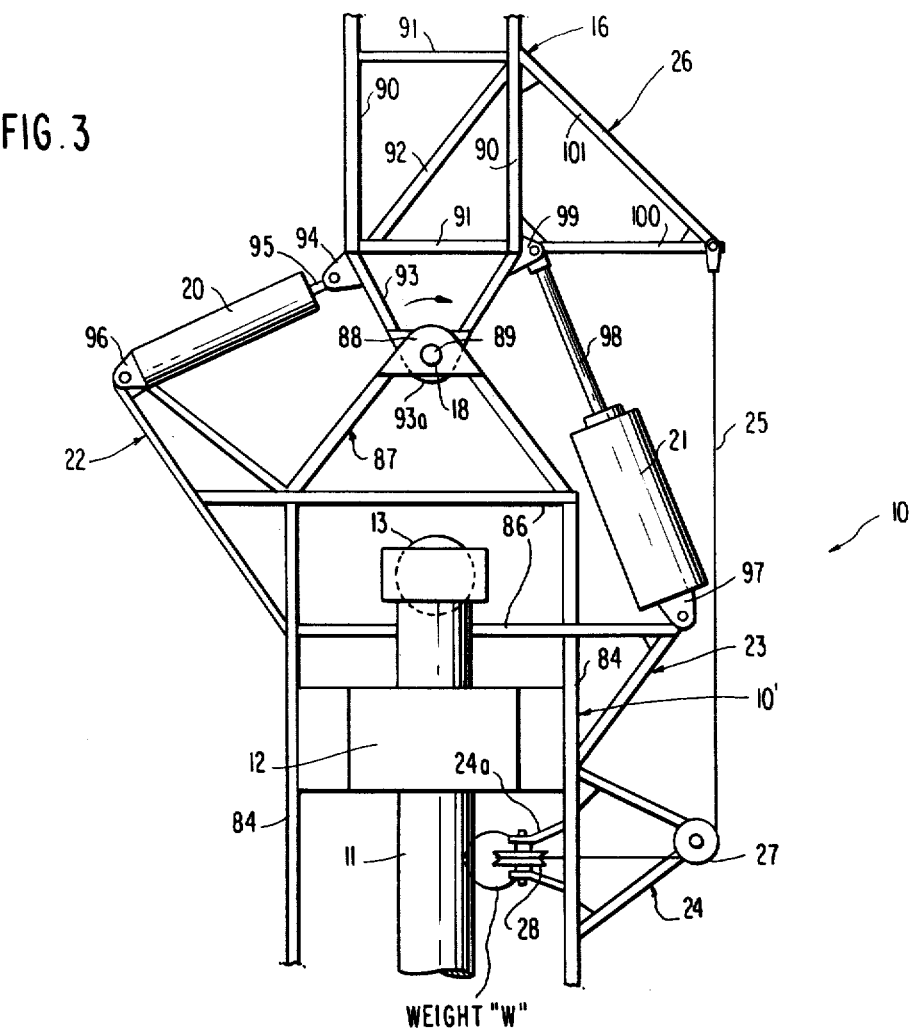
FIG. 3 is an enlarged plan view of the components of one embodiment of a power loading control system of the present invention for a hydraulic windmill of the type illustrated in FIGS. 1a–1c and 2.

Turning to FIG. 3, there is an enlarged plan view of portions of the hydraulic windmill 10 and the control system forming one embodiment of the present invention. The carriage 10' of windmill 10 is comprised of parallel, longitudinal frame members 84 which are joined at the rear by transverse bars 86, thus forming an open frame which is extended by a triangular frame assembly 87 defining at its apex a bearing 88 for a vertical post 89 defining the vertical pivot axis 18 for frame 16. Frame 16 likewise comprises laterally spaced, generally horizontal longitudinally extending beams 90 coupled together by transverse members 91, with the frame 16 further comprising diagonal reinforcing members 92. Thus, frame 16 also comprises an open framework which terminates at its forward end in a triangular assembly 93 bearing an apex 93a through which passes post or rod 89 and to which the apex member 94 are rigidly coupled such that the rod 89 rotates along with frame 16. In this embodiment, two hydraulic cylinders as at 20, 21 are employed for selectively pivoting the tail frame 16 about the vertical pivot axis 18 as defined by post 89, thus controlling tail motion. A bracket 94 fixed to the tail frame 16 is pivotably mounted to piston rod 95 of the smaller sized hydraulic cylinder 20, its opposite end being mounted by way of bracket 96 to a frame assembly indicated generally at 22 and fixed to carriage 10' and specifically to the side of the longitudinal frame member 84 of carriage 10'. Further, on the opposite side of the carriage 10' there is provided a further fixed mounting frame 23 to which is pivotably mounted a bracket 97 fixed to one end of hydraulic cylinder 21. A piston rod 98 projects from the opposite end of the hydraulic cylinder 21 and is pivotably mounted at its projecting end by way of bracket 99 to the opposite side of the tail frame 16 bracket 94.

In addition to the two cylinders 20 and 21, there is a further means for causing pivotable movement of the tail frame 16 relative to carriage 10'. Projecting laterally outwardly of tail frame 16 is a tail frame projection arm indicated generally at 26 and formed by a transverse beam 100 and a diagonal 101. At the outbound end of the transverse beam 100, there is fixedly attached one end of a cable 25, the cable 25 extending alongside of the carriage 10' over a longitudinal extent and being guided about an outboard sheave 27 which is mounted for rotation about a vertical axis on an open frame mounting bracket 24. The carriage 10' further carrys a second bracket 24a upon which is mounted a second sheave 28 for rotation about a horizontal axis with the cable 25 riding over sheave 28 and being fixed at its end to a weight W. The weight W is of sufficient mass to swing the tail frame 16 to the right, FIG. 3, to its furtherest angular position, clockwise, about axis 18, as per arrow, FIG. 3 away from the axis of the rotor drive shaft 11, in the absence of a sufficient force transmitted by cylinder 21 through piston rod 98 to the tail frame 16.

Figure 4:
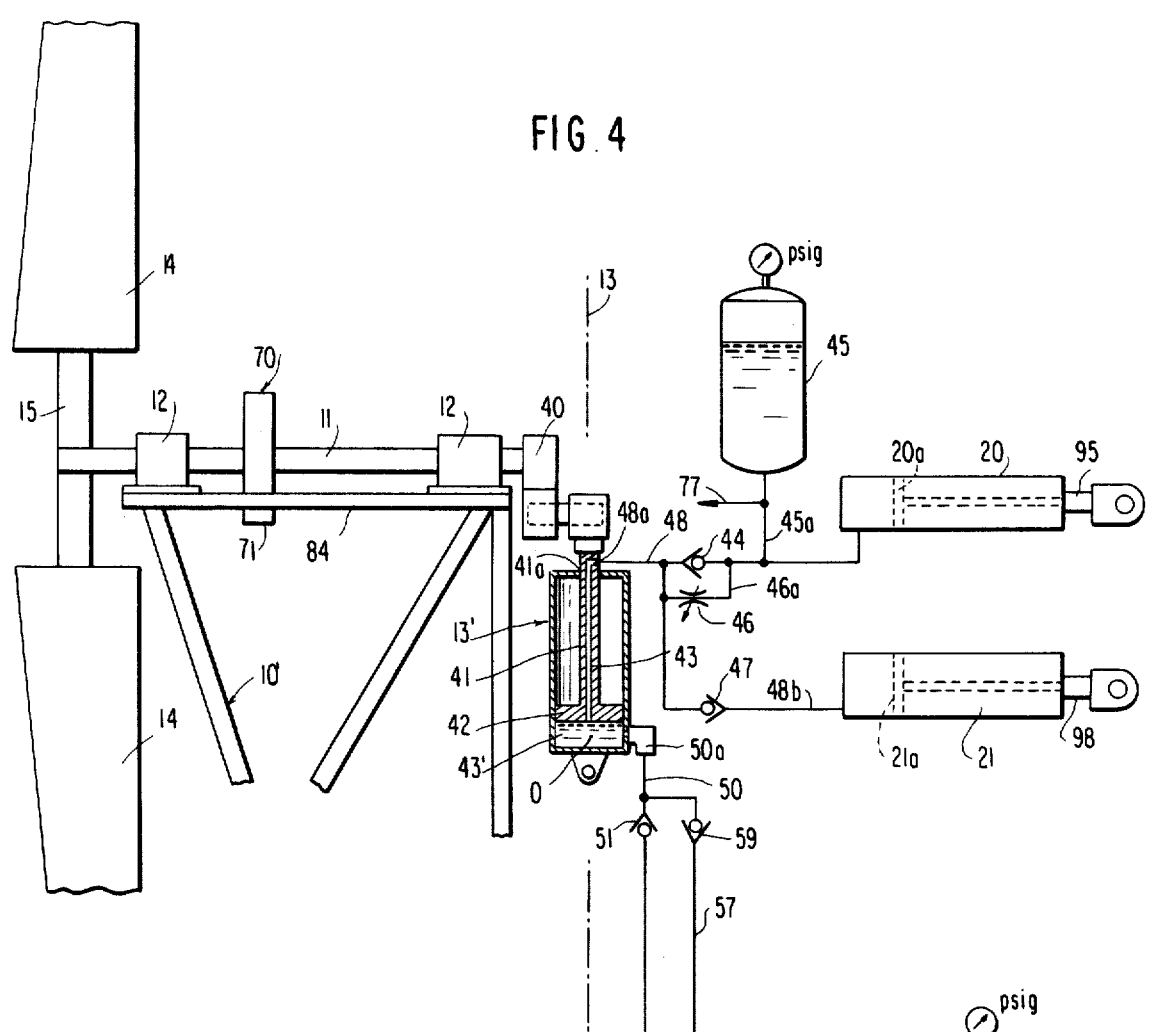
FIG. 4 is a schematic diagram of the control system for a hydraulic windmill illustrated in FIG. 3.

Referring to FIG. 4, the operation of the control system components illustrated in FIG. 3 may be further appreciated by additional reference to FIG. 4 which shows diagrammatically the hydraulic components of the control system and their operation. FIG. 4 illustrates the main hydraulic power transmission cylinder 13' which is shown in cross-section as bearing an axially slidable piston 42 at the lower end of a piston rod 41, which rod projects through an opening 41a within the upper end of cylinder 13'. The piston rod 41 connects by way of a crank arm 40 directly to the rotor-drive shaft 11, outside of the rear bearing 12 and remote from the windmill blades 14. As may by appreciated, piston 42 reciprocates within the hydraulic cylinder 14'. A small diameter hole 43 is drilled axially through a portion of the piston rod 41, at least from the lower face of piston 42. to a point where the piston rod 41 extends outwardly of cylinder 13', which drilled hole 43 communicates with a volume 43' between piston 42 and the bottom wall of cylinder 13', that volume 43' periodically cycles from peak hydraulic oil pressure to minimum oil pressure and bears a hydraulic fluid or oil 0 which circulates within a closed hydraulic loop generic to such hydraulic windmills. The pressure of the hydraulic fluid 0 in volume 43', causes a small amount of the hydraulic fluid mass, to pass from the drilled hole 43 to a point outside of cylinder 13'. A hose, line or tube 48 connects at one end via a radial passage 48a within the piston rod 41 and via axial hole 43 to volume 43'. The hose or tube 48 is connected via check valve 44 to hydraulic control cylinder 20. A branch line 48b leads from tube 48 and connects via check valve 47 to the second control cylinder 21. Within line 48, there is provided a surge chamber 45 which connects to line 48 via line 45a, which smooths out the pressure of the of the hydraulic fluid within lines 48, 48b. Further, a line 46a bypasses the check valve 44 and carries a pressure relief valve 46 which allows for oil pressure relief when the wind velocity drops or when the windmill tail 17 has rotated too far from its rotor axis alignment position. At the lower end of the cylinder 13', there is provided a fitting 50a to which connects a hydraulic fluid supply line 50 bearing a check valve 51, a through valve 52, a pressure compensating flow control valve 53, and terminates at a hydraulic motor 54. The oil is returned to cylinder 131 through line 57 from motor 54 and check valve 59 is carried within the line return portion of the loop leading to fitting 50a. Fluid returns to cylinder 13 and specifically the chamber defined by piston 42 and the bottom of cylinder 13', during the suction stroke of piston 42 as piston 42 rises vertically upwardly within cylinder 13'. An accumulator chamber 56 is coupled to return line 57 to force the oil back to cylinder 13' as the elevation of this cylinder is usually much greater than its suction lift capability. The oil O rises to a predetermined level or extent within tank 56 compressing the air A above that oil level, which air pressure is maintained at approximately 100 psig for a rotor height for rotor shaft 11 and blades 14 of approximately 50 feet above the tank. The hydraulic motor 54 is directly connected via a shaft 54a to an electric generator 55 which supplies electricity via leads 55a to a load (not shown). Further, a bypass line 58a connects the return line 57 intermediate the hydraulic motor 54 and tank 56, via a presssure relief valve 58, to the supply line 50, upstream of the through valve 52. The pressure relief valve 58 is set to relieve the pressure in line 57 well below the maximum allowable pressure of the components of the hydraulic system, that is, the closed loop formed by lines 50, 57.

The sequence of operation is as follows. On the down stroke of piston 42, hydraulic oil O is forced through line 50, check valve 51 through valve 52, pressure-compensating flow control valve 53 to the hydraulic motor 54. It returns to cylinder 13' during the upstroke of piston 42. During the down stroke, check valve 59 prevents flow into line 57 via the connection at point 57a between lines 50 and 57. During the up stroke, check valve 51 prevents hydraulic fluid moving upwardly through line 50 into the chamber defined by piston 42 and the lower end of cylinder 13'.

Figure 1B:
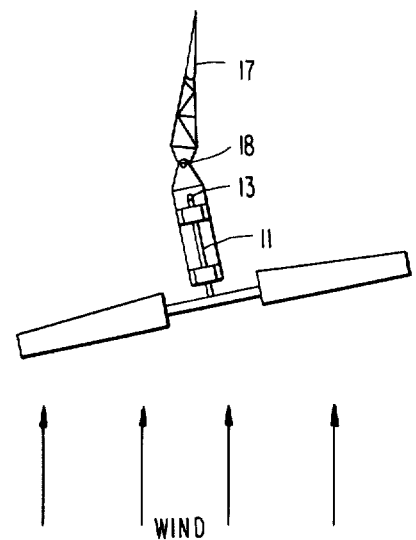
Figure 1C:
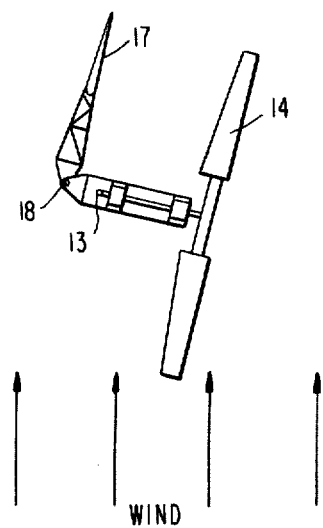

Assuming the maximum useful pressure of the hydraulic fluid within the hydraulic circuit to be 500 psig, then a pressure signal of 550 psig for example, acts to start or initiate rotation of the tail frame 16 to a position with the windmill blades 14 slightly "out of the wind," FIG. 1b. The use of the check valve 44 maintains the pressure in tank 45 at an average maximum pressure. Bleed valve 46 (a variable restriction within line 46a) functions to lower the pressure within tank 45, but at a relatively slow rate. At 550 psig, the force acting through the piston rod 95 of cylinder 20 plus the counterweight force of counterweight W overcomes that of cylinder 21 and the tail 17 of the windmill will start to move clockwise, FIGS. 1b, 3.

Assuming a net minimum of 50 psig in line 48 (tank 56 pressure less hydrostatic pressure of the elevation of that tank which is approximately equal to the axis of rotation of rotor drive shaft 11), the cylinder 21 must be sized such that upon application of the fluid pressure through piston rod 98, cylinder 21 moves the tail into operating position against the action of counterweight W. For a counterweight of 500 pounds, the cylinder bore area of cylinder 21 (for 50 psig) would necessarily have to be greater than twenty square inches for a force double that of the counterweight W. This provides a diameter of approximately five inches. If the minimum oil pressure drops well below the 25 psig level (as would happen if a serious leak in the hydraulic system arose), the counterweight W will drop, causing the tail 17 to move to its furtherest angular position away from the rotor axis, see FIG. 1c.

For a low pressure cylinder 21 diameter of five inches and with a line pressure of 500 psig within line 48, the high pressure cylinder 20 may be sized to give a force of over 500 pounds for a hydraulic pressure of 500 psig. The area of the low pressure control cylinder 21 would be 0.9 inches squared for a bore diameter or about one-sixteenth inches. Accurate sizing of the control cylinders 20 and 21 is required.

The control system of the present invention is both simple in its operation and the components are inexpensive and reliable. Further, the means for a fail-safe mode is possible by utilization of the counterweight W required to be unbalanced by the minimum fluid pressure. Alternatively, the counterweight may be eliminated and a source of constant gas pressure may be required to act on the rod side of cylinder 21, that is, to the right side of piston 21a of that cylinder.

Figure 5:
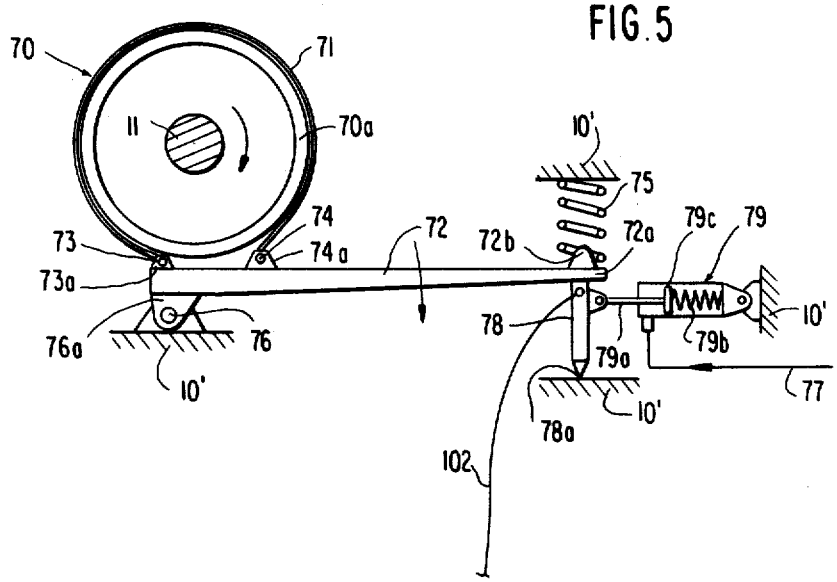
FIG. 5 is an elevational view of a windmill rotor drive shaft brake system and an operating mechanism forming another embodiment of the power loading control system for a hydraulic windmill.
Figure 6:
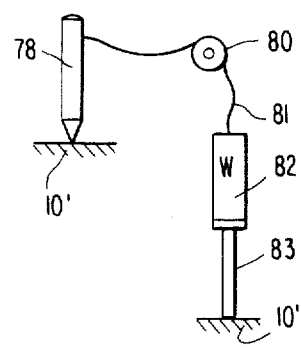
FIG. 6 is an elevational view of an alternate arrangement for operating a windmill rotor drive shaft brake system illustrated in FIG. 5.

Another aspect of the control system of the present invention is illustrated in FIGS. 5 and 6 in detail, while FIG. 4 shows the location of a band type brake mechanism indicated generally at 70, being fixed to the carriage 10' and spanning transversely across and between laterally opposed frame members 84, the mechanism functioning to effectively brake the rotor drive shaft 11 to prevent rotation of the windmill blades 14 irrespective of the wind velocity. The band brake assembly 70, as indicated further in FIG. 5, involves a cylindrical drum 70a which is fixedly mounted to the rotor drive shaft 11 and rotates therewith. The band is adapted to frictionally engage the periphery of the drum 70a, if the hydraulic pressure reaches unacceptable values, as for instance, 1000 psig, a value well in excess of the 500 psig which normally starts the pivoting or movement of the tail 17 to a position which causes, in turn, angular displacement of the blade via pivoting of the rotation axis of drive shaft 11 which is normally in line with the wind.

In FIG. 5, the side elevational view of the band brake assembly 70 shows the brake band 71 as being slightly spaced from the periphery of the drum 70a. The band 71 at one end is pivotably coupled via bracket 74a and pin 74 to a point along the length of actuator arm 72 which is at a given distance from the pivot axis of the arm as defined by pivot pin 76 which mounts via bracket 76a to a fixed frame of the carriage 10'. The opposite end of the brake band 71 is pivotably coupled by way of bracket 73a and pin 73 to the actuator arm at a position along the actuator arm which is essentially aligned with the pivot axis 76 for that arm. The arm is illustrated as rotatable in FIG. 5 in a clockwise direction, being driven by a compression coil spring 75 functioning to tighten the band 71 against the periphery of drum 70a. The arm 72 is prevented from rotating by the presence of a movable pin 78 whose lower end contacts the fixed carriage 10' and whose upper end abuts the bottom of the actuator arm 72, at its outboard end 72a. A projection 72a on the end 72a of the arm mounts the coil spring 75 which is compressed between a fixed portion of the carriage 10' and arm 72. A brake actuating hydraulic cylinder 79 has one end pivotably coupled to a fixed member of carriage 10'. A piston rod 79a projects outwardly of the cylinder 79 and is pivotably coupled, at its end, to pin 78 at a point remote from the contact point 78a with the fixed carriage member 10'.

A fitting 79b permits a hydraulic line 77 to be connected to the cylinder to the side of the piston 79c. Line 77 connects to tank 45, FIG. 4, such that the brake assembly is responsive to the tank 45 pressure, the tank pressure acting in a position to a precalibrated spring 79b positioned internally of the cylinder and pressing on a piston 79c to the side opposite that open to line 77. When the line pressure within line 77 reaches a predetermined magnitude, piston 79c compressing spring 79b to the extent where the pin 78 is removed from beneath the actuator arm 72 and the compression spring 75 causes arm 72 to pivot clockwise about the pivot axis as defined by pin 76 to effect frictional clamping drum of band 71 about drum 70a and preventing rotation of shaft 11 regardless of the wind velocity acting on the blades 14 of the windmill.

Additionally, pin 78 may be displaced for emergency shut down by way of a cable 102 conoected to pin 78 and extending downwardly downwardly to the ground level, FIG. 4, from the tail end of the windmill.

Additionally, the present invention accomplishes automatic shut down of the windmill by activating the brake mechanism 70 responsive to undue vibration of the windmill which may be caused by serious unbalance of the elements making up the windmill or an extremely high wind velocity.

As illustrated in FIG. 6, the same pin in 78 as FIG. 5, has coupled thereto a second cable 81 which passes over a sheave 80 mounted for rotation about a horizontal axis, the cable 81 bearing a weight 82 which is supported on the top of a narrow stand on support 83. The cable 81 is loose so as to normally not affect the action of the weight 82 balanced on stand 83. The stand 83 is fixed to carriage 10'. Undue vibration causes the weight 82 to fall from its stand or support 83. As it falls, it tightens cable 81, pulls the pin 78 from beneath the outboard end of the actuator arm 72, releasing spring 75 and tightening the band 71 about drum 70a.

What is claimed is:

1. A hydraulic windmill for extracting useful energy from the wind, said windmill comprising:

a carriage mounted for rotation about an axis at right angles to the axis of the wind, means for mounting a shaft on said carriage for rotation about its axis and in the direction of the wind, windmill blades fixed to said shaft, projecting into the wind, and being driven thereby to effect rotation of the shaft about its axis, a tail pivoted to said carriage for rotation about an axis parallel to the axis of rotation of the carriage and remote from the blades, a closed loop hydraulic circuit, bearing hydraulic fluid, pump means within said hydraulic circuit and being operatively coupled to said windmill shaft to pressurize said hydraulic fluid in said closed loop circuit, a flow impedance within said circuit including at least useful energy conversion means for operation of an end use element, the improvement comprising:

a first hydraulic cylinder operatively coupled between said carriage and said pivotable tail, means for connecting said hydraulic fluid circuit to said first hydraulic cylinder for directly operating said first hydraulic cylinder in response to hydraulic fluid overpressurization to rotate said tail away from its operating plane and thereby shift said blades with respect to said wind to control the maximum output power of said hydraulic windmill, a second hydraulic cylinder operatively coupled to said hydraulic circuit for sensing a loss in minimum required hydraulic pressure within said circuit as from a leak in the hydraulic system, said second hydraulic cylinder being operatively coupled to said tail for rotating said tail away from its operating plane in response to minimum hydraulic fluid pressure within said fluid circuit.

2. A hydraulic windmill for extracting useful energy from the wind, said windmill comprising:

a carriage mounted for rotation about an axis at right angles to the axis of the wind, means for mounting a shaft on said carriage for rotation about its axis and in the direction of the wind, windmill blades fixed to said shaft, projecting into the wind, and being driven thereby to effect rotation of the shaft about its axis, a tail pivoted to said carriage for rotation about an axis parallel to the axis of rotation of the carriage and remote from the blades, a closed loop hydraulic circuit, bearing hydraulic fluid, pump means within said hydraulic circuit and being operatively coupled to said windmill shaft to pressurize said hydraulic fluid in said closed loop circuit, a flow impedance within said circuit including at least useful energy conversation means for operation of an end use element, the improvement comprising:

a first hydraulic cylinder operatively coupled between said carriage and said pivotable tail, means for connecting said hydraulic fluid circuit to said first hydraulic cylinder for directly operating said first hydraulic cylinder in response to hydraulic fluid overpressurization to rotate said tail away from its operating plane and thereby shift said blades with respect to the direction of said wind to control the maximum output power of said hydraulic windmill, and wherein said hydraulic windmill further comprises a counterweight operatively coupled to said tail for rotating said tail away from its operating plane, and wherein a second hydraulic cylinder is operatively coupled to said tail and is responsive to minimum hydraulic fluid presssure within said closed circuit and acting in opposition to said counterweight, such that when the hydraulic fluid pressure within said closed loop hydraulic circuit decreases below a minimum value, said counterweight acts to rotate said tail away from its operating plane.

3. The hydraulic windmill as claimed in claim 2, further comprising means for continuously comparing the hydraulic fluid pressure within said closed loop hydraulic circuit to a fixed lower hydraulic pressure, and means for rotating said tail from its operating plane when the pressure differential rises beyond a preset value.

4. The hydraulic windmill as claimed in claim 3, wherein said pump means comprises a piston rod carried piston reciprocating within a closed pump cylinder, and said hydraulic windmill further comprises means for detecting and transmitting an overpressure of the hydraulic fluid from said pump cylinder, said detecting and transmitting means comprising a drilled hole through said piston rod within said pump cylinder and leading to a point outside said pump cylinder and a line connecting said piston rod hole to said hydraulic cylinder for rotating said tail away from its operating plane.

5. The hydraulic windmill as claimed in claim 4, further compriing surge tank means within said line connecting said drilled hole to said hydraulic cylinder for providing an average peak pressure volume, and wherein said hydraulic windmill further comprises a check valve within said line connecting said drilled hole within said piston rod to said hydraulic cylinder.

6. The hydraulic windmill as claimed in claim 5, further comprising a bleed valve connected in parallel across said check valve to provide a predetermined loss of pressure within said line over time to allow the tail to return to its operating plane when the overpressure condition is terminated, as by a drop in wind velocity.

7. The hydraulic windmill as claimed in claim 6, further comprising means for releasing gas pressure within said surge tank to maintain a minimum hydraulic fluid pressure for rotating the tail of the hydraulic windmill a predetermined distance away from its operating plane.

* * * * *